United States Patent [19]
Saito et al.

[11] Patent Number: 5,315,569
[45] Date of Patent: May 24, 1994

[54] APPARATUS FOR RECORDING AND/OR REPRODUCING INFORMATION ON/FROM OPTICAL CARD-LIKE INFORMATION RECORDING MEDIUM

[75] Inventors: Akito Saito; Tsuyoshi Togawa, both of Hino, Japan

[73] Assignee: Olympus Optical Co., Ltd., Tokyo, Japan

[21] Appl. No.: 804,326

[22] Filed: Dec. 10, 1991

[30] Foreign Application Priority Data

Dec. 10, 1990 [JP] Japan ................... 2-407223
Dec. 18, 1990 [JP] Japan ................... 2-411284
Feb. 13, 1991 [JP] Japan ................... 3-020189

[51] Int. Cl.$^5$ ............................................. G11B 7/00
[52] U.S. Cl. ............................. 369/44.32; 369/47
[58] Field of Search ............... 369/44.32, 44.28, 44.26, 369/44.29, 32, 44.27, 47, 32; 235/454, 476, 483, 479, 475, 485, 477; 360/2; 250/201.5

[56] References Cited

U.S. PATENT DOCUMENTS

| | | | |
|---|---|---|---|
| 4,800,546 | 1/1989 | Shikichi et al. | 369/44.28 |
| 4,885,458 | 12/1989 | Horiguchi et al. | 235/454 |
| 4,982,393 | 1/1991 | Matsushita et al. | 369/44.32 |
| 5,008,552 | 4/1991 | Kuramochi et al. | 235/454 |
| 5,083,301 | 1/1992 | Matoba et al. | 369/44.28 X |
| 5,105,072 | 4/1992 | Saito et al. | 235/454 |

FOREIGN PATENT DOCUMENTS 6381366  5/1988 Japan .
6399367  6/1988 Japan .
63109580 7/1988 Japan .

Primary Examiner—Aristotelis Psitos
Assistant Examiner—Thang V. Tran
Attorney, Agent, or Firm—Stevens, Davis, Miller & Mosher

[57] ABSTRACT

An apparatus for recording/reproducing optical information on/from an optical card, in which optical information is recorded and/or reproduced on/from said optical card by relatively moving the optical card and an optical head with respect to each other in a track direction and a tracking direction; the optical head and optical card are driven by a driving motor with respect to each other under a normal moving condition of the apparatus; in the apparatus it is arranged such that an anomalous condition of the relative movement between the optical card and the optical head is detected and when this anomalous condition is detected, an operational movement of said apparatus is changed such as that for instance, as to stop an electric supply to the driving motor.

11 Claims, 10 Drawing Sheets

Optical Head Moving Direction
A ←→ B
Shuttle Moving Direction

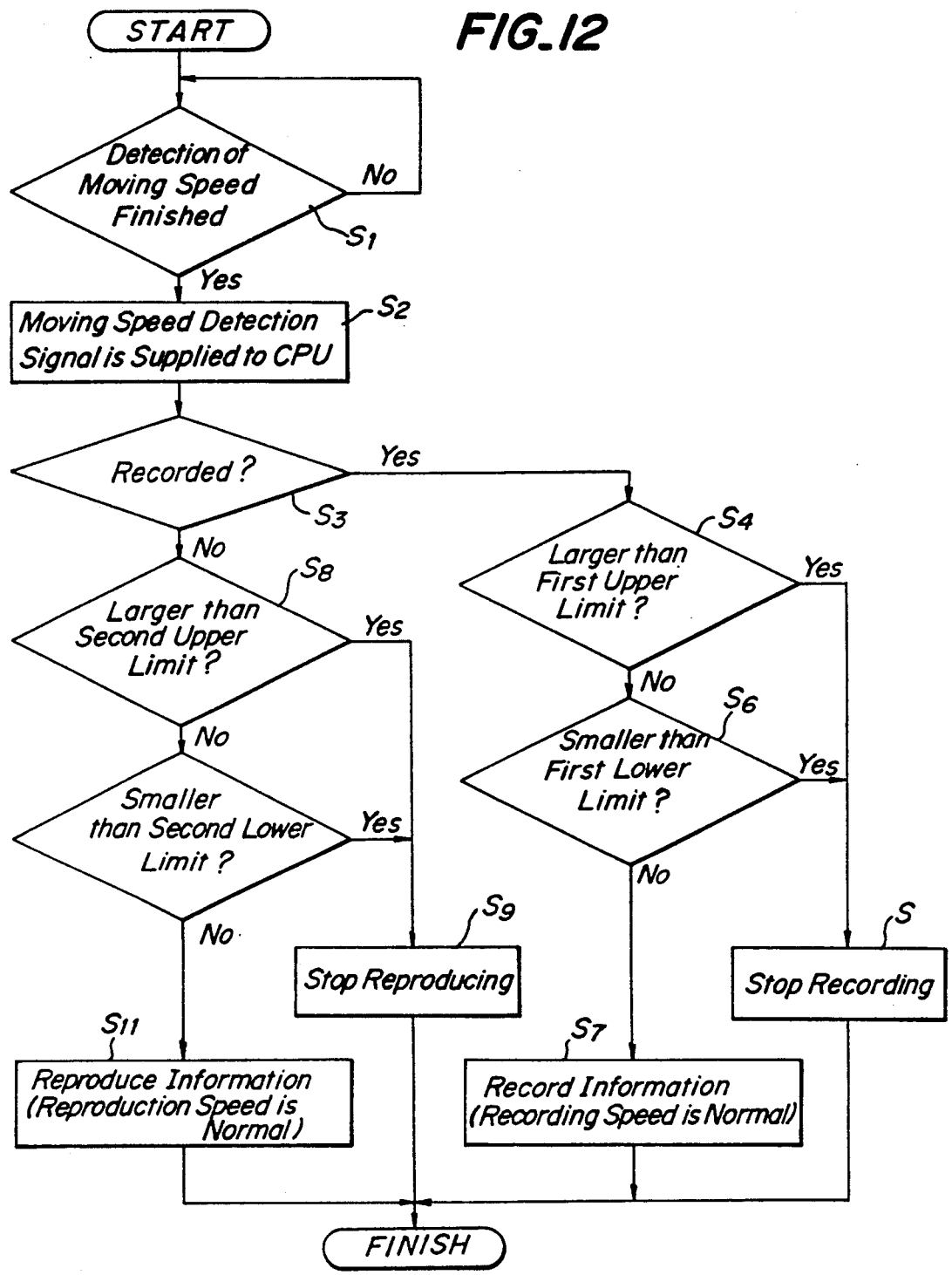

APPARATUS FOR RECORDING AND/OR REPRODUCING INFORMATION ON/FROM OPTICAL CARD-LIKE INFORMATION RECORDING MEDIUM

BACKGROUND OF THE INVENTION

1) Field of the Invention

The present invention relates to an apparatus for recording and/or reproducing optical information on/from a card-like information recording medium, such as an optical card, and particularly relates to an apparatus in which an optical head provided in the apparatus and the recording medium are arranged to be relatively moved with respect to each other in a longitudinal direction of the recording medium and a direction perpendicular thereto. According to the present invention, the relative movement of the optical head and the recording medium is controlled so as not to damage the optical card and the recording medium.

2) Description of the Related Art

On an optical card, it is impossible to rewrite optical information, once information has already been written on. However, the optical card has a great memory capacity, i.e. about several thousand times to ten thousand times as large as that of a magnet card. The optical card has its memory capacity of about from one to two megabytes, so that a great number of applications such as a bankbook, a pocket map and a prepaid card for shopping can be considered on the optical card.

Many constructions of optical cards have been suggested; and one of the constructions of the optical card, which has been suggested by the applicant in Japanese Preliminarily Laid-open Publication No. 63-37836, is shown in FIG. 1. On the optical card 11, there is provided an optical information recording portion 12, which comprises a plurality of tracks 13 extending in a longitudinal direction (track direction) of the optical card 11, being parallel to each other. On both sides of the optical information recording portion 12, there are arranged ID portions 14A and 14B, respectively, and an information recording area 15 therebetween. In each ID portion 14A and 14B, address information corresponding to each track 13 is recorded.

In an apparatus by which optical information is recorded and/or reproduced on/from such optical card by moving the optical head and the optical card in a relative and reciprocal manner, the optical card is generally held in a container, which is a so-called shuttle; the shuttle containing the optical card therein is arranged to be relatively moved with respect to the optical head in the track direction; and the optical head is arranged to be relatively moved with respect to the optical card in a direction perpendicular to the track direction (tracking direction). FIG. 2 is a plan view showing the positional relation between the optical head 31 and the shuttle 21 containing the optical card 11 in the apparatus. The arrow A represents the track direction along which the shuttle 21 is relatively moved with respect to the optical head 31, and the arrow B represents the tracking direction, perpendicular to the track direction, along which the optical head 31 is relatively moved with respect to the optical card 21.

In such apparatus for recording/reproducing optical information on/from an optical card, the shuttle is generally driven with the aid of a driving motor, such as a linear motor. When some accident happens in a driving system for moving the shuttle, there is a possibility that the shuttle is moved over its movable limitation. Therefore, when some accident happens in the driving system, an electric supply for the driving motor should be stopped in order to prevent breakage of the linear motor.

In order to solve such problem, in Japanese Utility Model Preliminarily Publication No. 63-81366, is disclosed an apparatus having stoppers on both end portions of a shaft for supporting the optical head. There are provided two electric conductors on the stoppers, respectively, and there are also arranged plastic members having electric conductivity on both ends of the optical head in its moving direction; and the contact of the optical head and the stoppers are detected by a detector, which is arranged to detect the fact that the electric conductors electrically shorten when the optical head makes contact against the stoppers. Further, in Japanese Utility Model Preliminarily Publication No. 63-99367, is disclosed an apparatus having magnetoelectric elements on both end portions of a movable distance of an optical head and plastic magnet members on both end portions of the optical head. Therefore, the fact that the movable body arrived to the end portions of the movable distance thereof is detected with the aid of the magnetoelectric elements. Furthermore, in Japanese Utility Model Preliminary Publication No. 63-109580 is disclosed an apparatus having buffer members having an electric conductivity on both end portions of a movable range of coils of an optical head, and the buffer members are connected to an electric circuit by which an electric supply for the coils is stopped when the optical head has moved over the movable range.

As stated above, in the conventional apparatuses, there are provided limit switches at both end portions of movable range of the movable body, such as optical head, magnetic head and coils provided therein, so as to detect that the movable body has moved to the end portions of the range; and then the electric current supply to the driving motors for driving the movable body is interrupted. However, in the conventional apparatuses, there is a drawback that the construction of the apparatus becomes complex and the cost for manufacturing would increase because the limit switches are arranged only for the purpose of detecting that the movable body has moved to the end portions of the range.

FIG. 3 is a side view showing the positional relation between the optical head 31 and the shuttle 21 containing the optical card 11 therein. The shuttle 21 comprises an auxiliary plate 21a and a press plate 21b which serve to hold the optical card 11 therebetween at a desired position without deviation, a spring 21c for energizing the press plate 21b in an upper direction, and a base plate 21d. The optical card 11 is inserted between the auxiliary plate 21a and the press plate 21b; and the spring 21c is arranged between the press plate 21b and the base plate 21d. The press plate 21b is energized with respect to the auxiliary plate 21a by means of the spring 21c, so that the optical card 11 is contained in the shuttle 21 in a stable manner. The shuttle 21 is reciprocally moved in the track direction by a driving motor (not shown in FIG. 3).

In such conventional apparatus, there is a possibility that when a driving circuit for driving the optical head 31 is damaged, for example, when the optical head 3 is driven over the movable range thereof. As clear from FIG. 3, an objective lens 31d of the optical head 31 is generally positioned in a level lower than the level of the upper surface of the auxiliary plate 21a, due to a working distance of the objective lens 31d. Therefore, when the optical head 31 has been moved over the movable range thereof, the objective lens 31d would collide against the auxiliary plate 21a; and in the worst case the objective lens 31d would be broken so that optical information could not be recorded/reproduced on/from the optical card 11 any more.

In the optical card 11 shown in FIG. 1, there are provided ID portions 14A and 14B on both sides of the optical card 11 in its longitudinal direction; therefore address information of each track recorded thereon can be read out when the optical card 11 is moved with respect to the optical head not only from right to left but also from left to right. That is to say, when optical information is recorded/reproduced by moving the optical card 11 from the left side to the right side in the track direction, the desired track is recognized with the aid of track address information recorded on the left side ID portion 14A; and when optical information is recorded/reproduced by moving the optical card 11 from the right side to the left side the desired track is recognized with the aid of track address information of the right side ID portion 14B. It should be noted that the ID portions 14A and 14B are arranged inside by a given distance from both ends of the optical card 11. The margins outside the ID portions are arranged in order to proof the influence of defect or dirt formed on the edge portions of the optical card 11. The margins are further utilized as an acceleration and deceleration area. That is to say, the moving speed of the optical card 11 is accelerated at one of these areas, at a constant speed between ID portions 14A and 14B and then decelerated at another ID portion.

In the apparatus, in which the optical card 11 is used as an information recording medium, information is recorded on the optical card 11 such that the optical card 11 is reciprocally moved in the track direction between the ID portion 14A and 14B at a constant speed; a clock signal is produced in a clock generating circuit, which is arranged to be independent from the movement of the optical card 11; a light beam emitted form a light source in the optical head 31, which is modulated being synchronized with the clock signal, is made incident upon the optical card 11. While, information is reproduced from the optical card 11 such that, clock signal is produced in accordance with an information reproducing signal obtained by detecting a reflection light beam reflected by the optical card 11; then the information reproducing signal is demodulated being synchronized with the clock signal obtained thereby.

In such an apparatus, it is desired that a variation of the relative moving speed of the optical card 11 and the optical head 31 between the ID portions 14A and 14B be almost zero. However, in order to make such variation zero, it is necessary to control the systems in the apparatus in a very complex manner; and then the cost for manufacturing the apparatus would be increased. Additionally, in the apparatus, the optical card and the optical head should be relatively moved between the ID portions 14A and 14B at a constant speed in order to record/reproduce optical information on/from the optical card in a good manner. Therefore, in the apparatus for the optical card, it is necessary to repeat the following steps that: the optical card 11 and the optical head 31 are started to be moved, the moving speed thereof is increased, decreased, and then stopped. However, in case the optical card is used as a recording medium, it is more difficult to control the relative moving speed of the optical head and the optical card in an exact manner in comparison with the optical disc, in which the optical disc is rotated in a given direction.

When information is reproduced from the optical card 11, the clock signal is produced in accordance with the information reproducing signal, which is obtained from the reflection light beam reflected by the data portion 15 of the optical card 11, and the information reproducing signal is demodulated being synchronized with the thus obtained clock signal. Thus, in case the variation of the relative moving speed of the optical head 31 and the optical card 11 is limited to a range, in which the clock signal can be produced, information could be reproduced without difficulty. However, when information is recorded on the optical card 11, the frequency of the clock signal for recording is not varied in accordance with the variation of the relative movement of the optical head 31 and the optical card 11. Therefore, the variation of the relative movement would make an influence to the information recording effect. If the variation of the relative movement when information is recorded is so large, that the variation of the relative movement when information is reproduced would substantially become large because the variation would be superimposed with the variation of the relative movement caused when information is recorded. Therefore, the information reproducing function of the apparatus would be decreased.

In case the optical card 11 having two ID portions 14A and 14B at both sides thereof as shown in FIG. 1 is used as an information recording medium, when the relative moving speed of the optical card 11 and the optical head 31 under the information recording manner is faster than the desired speed, a margin for the variation of the readable relative moving speed of the optical card and the optical head would be decreased. And in the worst case, ID portions 14A and 14B would be damaged due to the variation.

Even in case an optical card having one ID portion at one side thereof is used as an information recording medium, a margin for the variation of the readable relative moving speed of the optical card and the optical head would be decreased. And in the worst case, ID portions 14A and 14B would be also damaged.

On the other hand, the relative moving speed between the optical card 14 and the optical head 31 is slower than the desired speed, in case the optical card having two ID portions at both sides thereof is used as an information recording medium, the margin for the variation of the readable relative moving speed would be decreased; and in case the optical card having only one ID portion is used, not only the margin for the variation of the readable relative moving speed would be decreased but also the relative moving speed would not be increased upto the desired speed although the optical head is positioned at the information recording area of the optical card, so that the reproduction signal could not be reproduced.

SUMMARY OF THE INVENTION

The present invention has for its purpose to provide an apparatus for recording and/or reproducing optical information on and/or from an optical card, in which the optical card and an optical head are relatively moved with respect to each other in a track direction and a tracking direction to record and/or reproduce optical information on and/or from said optical card, comprising:

driving means for relatively moving said optical head and said optical card with respect to each other;

an anomalous condition detection means for detecting an anomalous condition of the relative movement between the optical card and the optical head;

control signal production means for producing at least one control signal in accordance with an output of said anomalous condition detection means; and control means for controlling an operation of said apparatus in accordance with the control signal produced in said control signal production means.

According to the first aspect of the apparatus of the present invention, said anomalous condition detection means comprises a relative movement detection means for detecting whether the optical card and the optical head are relatively moving or not with respect to each other in said track and tracking direction, said control signal production means produces said control signal when the relative movement of the optical card and the optical head is stopped for a predetermined time period; and said control means controls the apparatus in accordance with the control signal such that recording and/or reproducing optical information on and/or from the optical card are stopped.

In the first aspect of the present invention, the relative movement of the optical card and the optical head can be controlled without providing limit switches in the apparatus to stop the relative movement of the optical card and the optical head when an anomalous condition of the driving system of the optical card and the optical head is detected.

According to the second aspect of the apparatus of the present invention, said anomalous condition detection means comprises a position detection means for detecting a relative position of the optical head with respect to the optical card to detect that the optical head has moved beyond predetermined movement limits of the optical head;

said control signal production means produces a control signal when the optical head is moved beyond the predetermined movement limits; and said control means controls said driving so as to keep an objective lens arranged in the optical head away from an information record surface of the optical card when the optical head moves over the predetermined movement limits in response to said control signal produced in said control signal production means.

Therefore, in the second aspect of the present invention, it is arranged that when the optical head is moved in a tracking direction with respect to the optical card beyond the predetermined limit, the objective lens provided in the optical head is kept away from the upper end portion of a container for holding the optical card, so that it can be prevented that the objective lens is broken by collision with the container.

Further, according to the third aspect of the apparatus of the present invention, said anomalous condition detection means comprises a relative moving speed detection means for detecting the relative moving speed of the optical card and the optical head and a relative moving speed range setting means for setting a first moving range of the relative moving speed of the optical card and the optical head when optical information is recorded on the optical card and a second moving range of the relative moving speed of the optical card and the optical head when optical information is reproduced from the optical card;

said control signal production means produces a control signal when said relative moving speed for recording optical information goes beyond the first relative moving speed range or when said relative moving speed for reproducing optical information goes beyond or over the second relative moving speed range; and said control means controls the apparatus so as to inhibit to record and/or reproduce optical information on/from the optical card in response to the control signal;

wherein said first relative moving speed range is arranged to be smaller than said second moving speed range.

In the third aspect of the present invention, since an allowance of the relative moving speed of the optical card and the optical head during information is recorded on the optical card is arranged to be smaller than an allowance during information is reproduced from the optical card, the variation of the relative moving speed of the optical card and the optical head during when information is recording becomes small, so that the variation of the relative moving speed during when information is reproduced becomes smaller to obtain a sufficient margin of the readable relative moving speed of the optical card and the optical head. Therefore, in the apparatus according to the third aspect of the invention, it is possible to decrease the number of error when information is reproduced from the optical card.

BRIEF DESCRIPTION OF THE DRAWINGS

FIGS. 11A-11F constitute a timing chart of signals used in detecting the relative moving speed of the optical head and the optical card in the relative moving speed detection circuit shown in FIG. 10; and FIG. 12 is a flow chart representing a function of the apparatus according to the fourth embodiment of the present invention.

DESCRIPTION OF THE PREFERRED EMBODIMENTS

Figure 1:
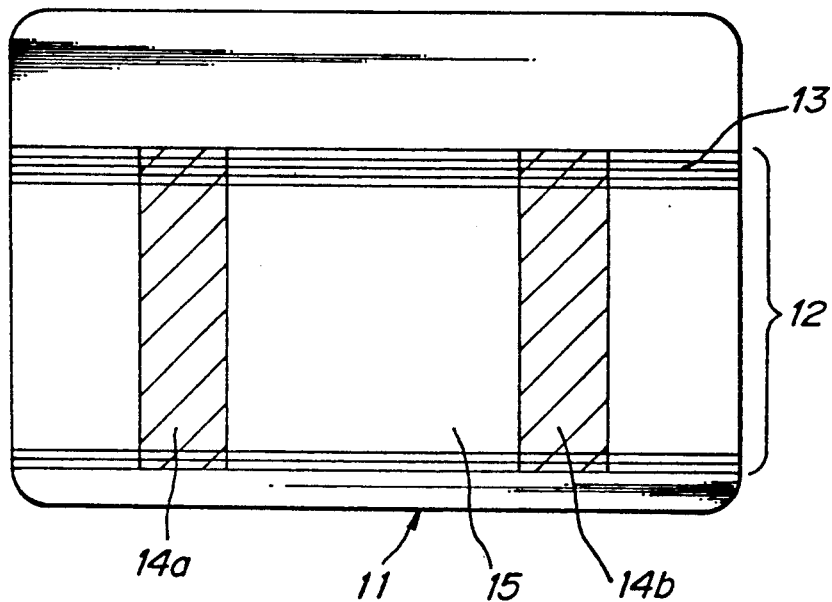
FIG. 1 is a schematic view showing a construction of an example of an optical card.
Figure 2:
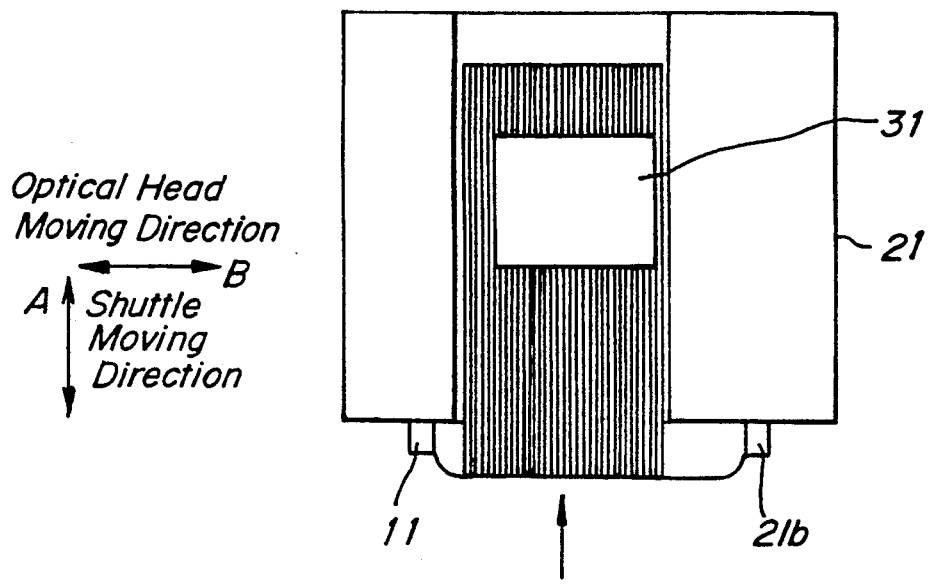
FIG. 2 is a plan view depicting a positional relation between an optical head and a shuttle for containing an optical card.
Figure 3:
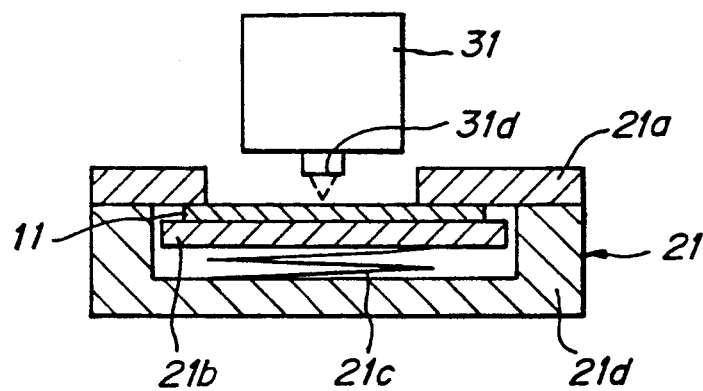
FIG. 3 is a side view indicating a positional relation in a horizontal level between the optical head and the shuttle.
Figure 4:
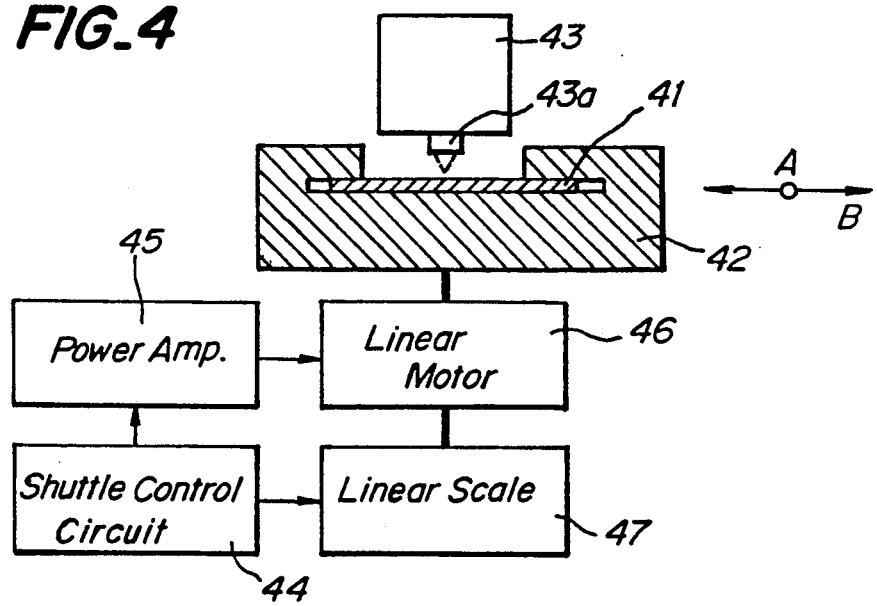
FIG. 4 is a block diagram illustrating a construction of an apparatus according to a first embodiment of the present invention.

FIG. 4 is a block diagram showing a construction of an apparatus according to a first embodiment of the present invention. An optical card 41 is held in a shuttle 42; and an optical head 43 is arranged above the shuttle 42. The shuttle 42 is arranged to move in a track direction A with respect to the optical head 43; and the optical head 43 is arranged to move in a tracking direction B, being perpendicular to the track direction A, with respect to the optical card 41. The shuttle 42 is moved by driving a linear motor 46 whose rotation is controlled by a shuttle control circuit 44 via a power amplifier 45. To the linear motor 46, is connected a linear scale 47 in order to detect a position of the shuttle 42 in the track direction with respect to the optical head 43. The linear scale 47 is so arranged that a period of an output signal of the linear scale 47 corresponds to 200 μm of a movement distance of the shuttle 42 with respect to the optical head 43; and then the moving speed of the shuttle 42 is controlled by the shuttle control circuit 44 so as to become constant at an information recording area of the optical card 11 in accordance with the positional information of the shuttle 42 obtained from the linear scale 47.

While the shuttle 42 is moved in the track direction, being controlled in such a manner, a light beam is emitted from the optical head 43 and it is made incident upon the optical information recording area of the optical card 43, recording/reproducing optical information on/from the optical card 41. After information is recorded/reproduced on/from the recording area of the optical card 41, the shuttle 42 is decelerated and then stopped. Therefore, the control mode of the apparatus is changed from a moving speed control mode to a positional control mode. The positional control is performed in order to prevent that when the shuttle 42 is decelerated and then stopped the position of the shuttle 42 is not deviated from its normal position to be stopped. Because, by an external disturbance, such as vibration, the light beam emitted from the optical head 43 can not be made incident upon a desired track.

As stated in the above, the optical head 43 is arranged to be moved in the tracking direction by a driving means (not shown) to make the light beam incident upon the desired track of the optical card. Focusing control and tracking control are conducted on the objective lens 43a of the optical head 43 to record/reproduce information on/from the desired track of the optical card 41 in a correct manner.

Figure 5:
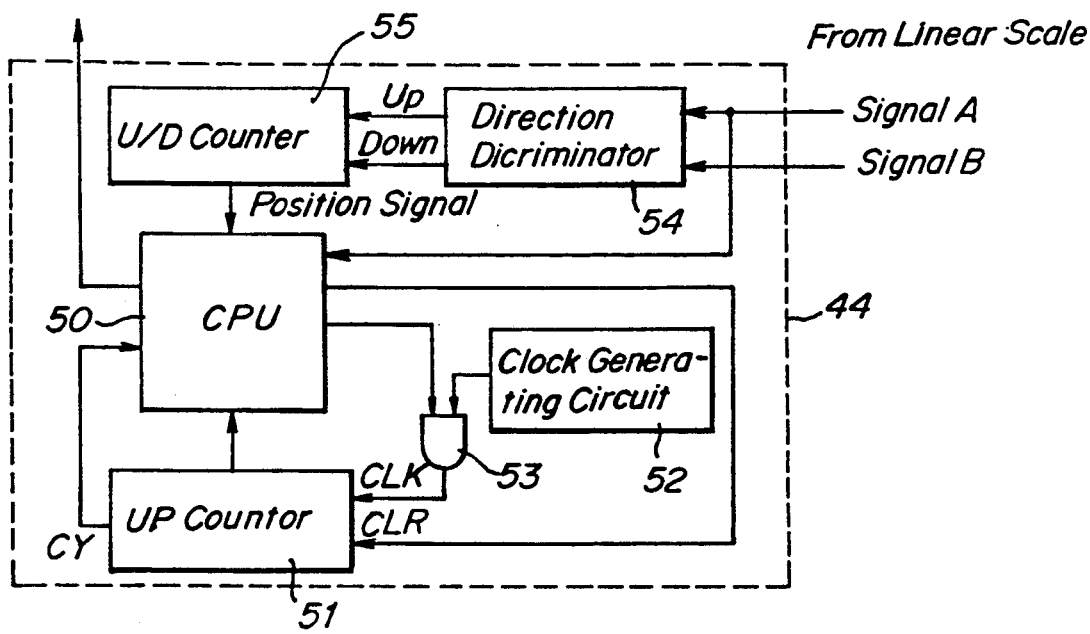
FIG. 5 is a block diagram representing a construction of a control circuit for controlling a movement of a shuttle arranged in the apparatus according to the first embodiment of the present invention.
Figure 6:
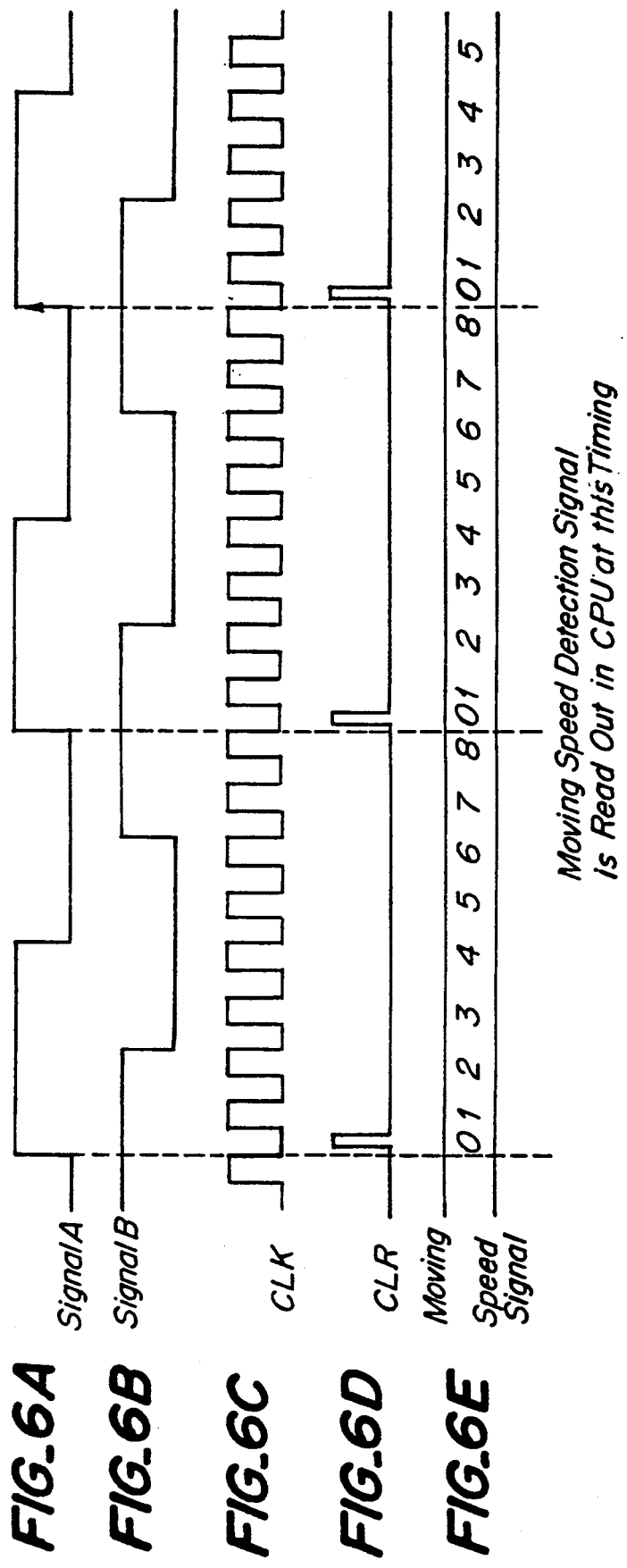
FIGS. 6A-6E constitute a timing chart of signals used in the control circuit represented in FIG. 5.

FIG. 5 is a block diagram depicting the shuttle controlling circuit 44 of the apparatus shown in FIG. 4. As shown in FIG. 5, the shuttle controlling circuit 44 comprises a CPU 50, an up counter 51, a clock generating circuit 52, an AND circuit 53, a direction discriminator 54, and an up and down counter 55. Signals A and B are supplied from the linear scale 47 to the direction discriminating circuit 54. It should be noted that the signals A and B are alternately supplied to the direction discriminator 54 every time the moving direction of the shuttle 42 is changed and that a phase of the signal A is deviated from that of the signal B by 90 degrees. In the direction discriminator 54, the moving direction of the shuttle 42 is discriminated from the difference of the phase of the signals A and B, and signals are supplied to an up terminal or a down terminal of the up and down counter 55 in accordance of the thus detected moving direction of the shuttle 42. The counted value of the up and down counter 55 corresponds to the position of the shuttle 42 with respect to the optical head 43, and the counted value is supplied to the CPU 50 as a positional signal of the shuttle 42. Further, it is arranged such that the signal A from the linear scale 47 is also supplied to the CPU directly.

The CPU 50 produces a clear signal (CLR) and sends it to a CLR terminal of the up counter 51; then the up counter 51 is made clear by the clear signal which is supplied to the up counter 51 each time the signal A from the linear scale 47 is changed from low level to high level; and at the same time the counted value of the up counter 51, which corresponds to a speed signal of the shuttle 42, is read out by the CPU 50.

Further, to the CLK terminal of the up counter 51, are supplied a clock signal from the clock generating circuit 52 and a signal, whose level is changed to high under the position control mode, from the CPU 50 via the AND circuit 53. Therefore, an output CLK of the AND circuit 53 is supplied to the up counter 51 when the relative moving speed of the shuttle 42 is controlled in the apparatus.

In the up counter 51, a time period corresponding to one period of the signal A supplied from the linear scale 47 under the position control mode is measured by counting the number of the clock signal supplied from the AND circuit 53; and thus the output of the up counter 51 represents the speed signal of the shuttle 42. For instance, in case the clock generating circuit 52 generates a signal having its frequency of 2 MHz and its period of 0.5 μsec and the period of the signal A, which corresponds to 200 μm of the moving distance of the shuttle 42, is supplied from the linear scale 47 to the circuit 44, when the output of the up counter 51 is 400, it takes 200 μsec in order that the shuttle 42 moves the distance of 200 μm (400×0.5 μsec). Therefore, it is proved that the shuttle 42 moved at a speed of 1 m/sec.

CPU 50 also produces a control signal for controlling the reciprocal movement of the shuttle 52 with respect to the optical head 43, and sends it to the power amplifier 45 in accordance with the positional signal of the shuttle 42 supplied from the up and down counter 55 and the speed signal of the shuttle 42 supplied from the up counter 51. It should be noted that when the count bit number of the up counter 51 is 16, the maximum count value of the up counter 51 is 65535; and thus in order to move the shuttle 42 by the distance 200 μm, it takes 32.7675 msec (65535×0.5 μm). Therefore, the slowest speed of the shuttle 42 which can be measured in the circuit 44 is 6.1 mm/sec.

When the moving speed of the shuttle 42 is slower than 6.1 mm/sec, the up down counter 51 is over-flowed; and then CY signal (abnormal speed signal) is supplied to the CPU 50. In the CPU 50, when the CY signal is detected, the supply of the control signal to the power amplifier 55 is stopped so as to interrupt the electric current supply of the linear motor 46. That is to say, when the shuttle 42 is moved upto the movable limit position, the shuttle 42 could not move anymore; and the output of the linear scale 47 is not changed, so that the up counter 51 is overflowed; then the abnormal speed signal is supplied to the CPU 50 and the current supply for the linear motor 46 is interrupted in order to prevent that the motor 46 is broken.

As stated in the above, according to the first embodiment of the present application, it is not necessary to arrange limit switches specially in the apparatus to detect the movable limit position of the shuttle 42, but the movable limit position can be detected with the aid of the shuttle movement control circuit 44. Additionally, in case the movement of the shuttle 42 is interrupted by something before the shuttle 42 reaches to the movable limit position, it is possible to detect the abnormal condition of the apparatus and to stop the electric supply of the driving motor 46 in the same manner.

FIGS. 6A to 6E show timing charts of respective signals used in the circuit 44. The phases of signals A and B (FIGS. 6A and 6B) supplied from the linear motor 46 are deviated from each other by 90 degrees; these signals A and B are further supplied to the up and down counter 55 via the direction discrimination circuit 54; and the output of the up and down counter 55 is supplied to the CPU 50 as a positional signal of the shuttle 42 with respect to the optical head 43. To the up counter 51, in which the moving speed signal of the shuttle 42 and the abnormal speed signal are produced, the clock signal CLK (FIG. 6C) and the clear signal CLR (FIG. 6D) from the clock generating circuit 52 and the CPU 50, respectively; and in CPU 50, it is arranged to read out the moving speed detection signal every when the level of the signal A is changed from low level to high level. Additionally, it is arranged that the time for the one period of the signal A is measured to detect the moving speed of the shuttle 42 with the aid of clock signals generated in the clock generating circuit 55.

Figure 7:
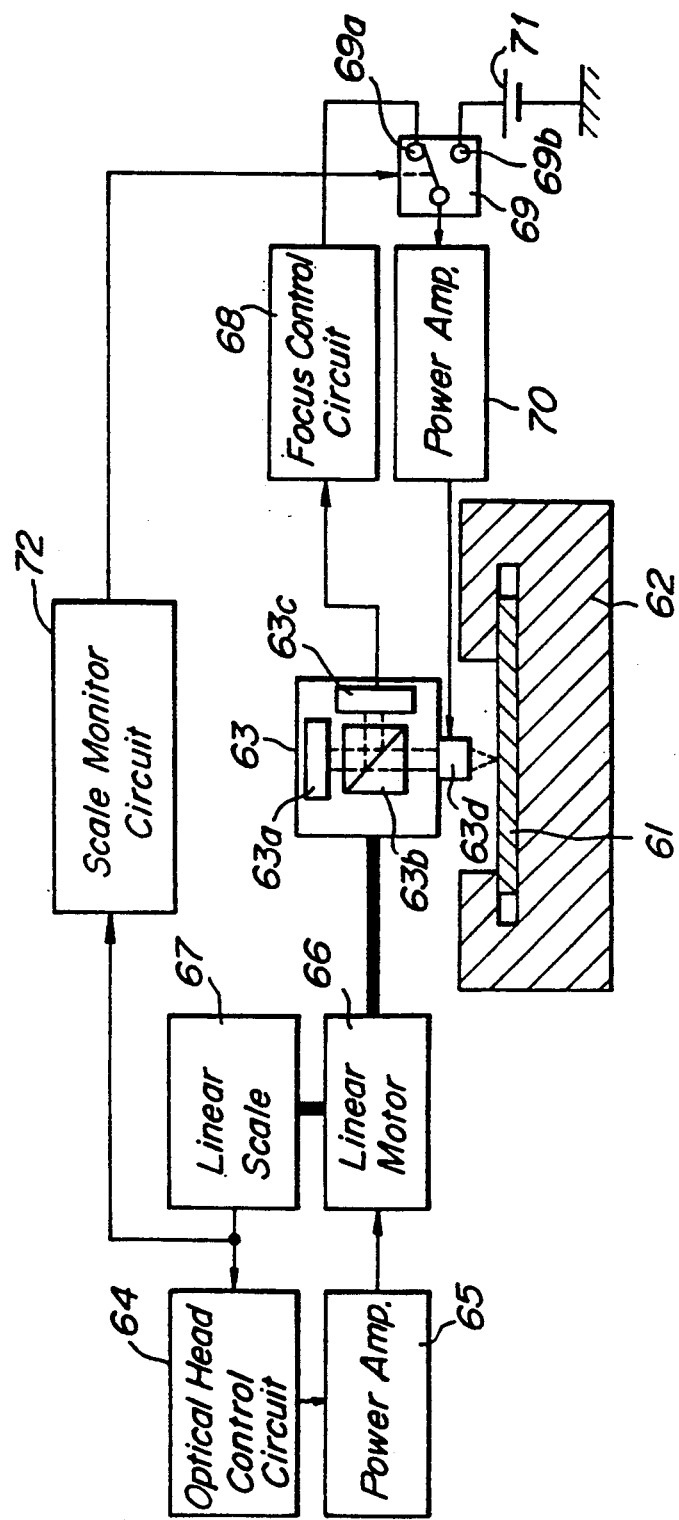
FIG. 7 is a block diagram showing a construction of an apparatus according to a second embodiment of the present invention.

FIG. 7 is a block diagram illustrating the structure of the apparatus according to the second embodiment of the present invention.

The optical card 61 is contained in the shuttle 62, and the shuttle 62, is driven in the track direction in a reciprocal manner by a shuttle driving circuit (not shown). The optical head 63 is driven in the tracking direction, being perpendicular to the track direction, by the linear motor 66, which is driven by the optical head control circuit 64 via the power amplifier 65. The optical head comprises a laser diode 63a, a prism 63b, a photo detector 63c and an objective lens 63d. The position of the optical head 63 with respect to the optical card 61 in the tracking direction is detected by the linear scale 67; and a position detection signal is supplied to the optical head control circuit 64, where the optical head 63 is controlled such that the objective lens 63d provided therein is positioned around the desired track of the optical card 61, from the linear scale 67.

When recording/reproducing optical information on/from the optical card 61, a light beam emitted from the laser diode 63a is made incident upon the optical card 61 via the prism 63b and the objective lens 63d; a reflection light beam reflected by the optical card 61 is made incident upon the photo detector 63c via the prism 63b to obtain a desired optical information. The output of the photo detector 63c is supplied to a focus control circuit 68 to detect a focus error signal from the output of the photo detector 63c and to generate a focus control signal. The objective lens 63d is controlled to be driven in the focus direction in accordance with the focus control signal, so that the light beam being made incident upon the optical card 61 is focused. When recording/reproducing optical information on/from the optical card 61 in a normal manner, an analog switch 69 is connected to a terminal 69a and thus, the output of the focus control circuit 68 is supplied to a power amplifier 70 via the analog switch 69. Then, the objective lens 63d is driven in the focus direction in response to the output of the power amplifier 70 to adjust the focusing condition of the light beam.

On the other hand, the output of the linear scale 67, by which the position of the optical head 63 with respect to the optical card 61 is detected, is supplied to a scale monitor circuit 72. In the scale monitor circuit 72, the position of the optical head 63 is monitored in accordance with the output of the linear scale 67. The scale monitor circuit 72 is arranged to produce a switching signal when it is detected that the optical head 63 is driven over predetermined movable limits. By the switching signal, the analog switch 69 is changed to a terminal 69b to connect the power amplifier 70 with a constant voltage power supply 71 before the objective lens 63d makes contact with the end portion of the auxiliary plate 62a of the shuttle 62. The constant voltage power supply 71 is arranged to supply a voltage to the power amplifier 70 by which the objective lens 63d can be driven to keep away from the optical card 61 in a direction being perpendicular with respect to the information recording surface of the optical card 61, is applied. Therefore, when the analog switch 69 is switched to the terminal 69b connected to the constant voltage power supply 71 in response to the switching signal supplied from the scale monitor circuit 72, the objective lens 63d is driven to keep away from the optical card 61 via the power amplifier 70 so as to prevent the objective lens 63d from colliding against the shuttle 62.

According to the second embodiment of the present invention, if the optical head 63 is driven beyond its movable limit due to some cause, the movement of the optical head 63 is detected by the scale monitoring circuit 72, and the analog switch 69 is switched from the terminal 69a connected to the focus control circuit 68 to the terminal 69b connected to the constant voltage power supply 71 to drive the objective lens 63d into the direction keeping it away from the optical card 61. Therefore, even if the optical head 63 is driven beyond its movable limits in an abnormal manner, it is possible to prevent the objective lens 63d from making contact with the shuttle 62. That is to say, even when the objective lens 63d is driven beyond the edge portion of the auxiliary plate 62a of the shuttle 62, since the objective lens 63d has been lifted upto a level higher than the height of the upper end of the auxiliary plate 62a, it is possible to prevent collision against the shuttle 62 and prevent the optical head 63 from being broken. Monitoring the position of the optical head 63 in the scale monitor circuit 72 is performed, for instance, in such a manner that the movable limit of the optical head 63, which means the objective lens 63d can be driven to the upper direction without contact of the objective lens 63d and the shuttle 62 under taking the moving speed of the objective lens 63 into consideration, is preliminarily provided in the linear scale 67; and in the circuit 72, it is arranged that when the optical head 63 interrupts this movable limit, the switching signal for switching the analog switch 69 is generated.

Figure 8:
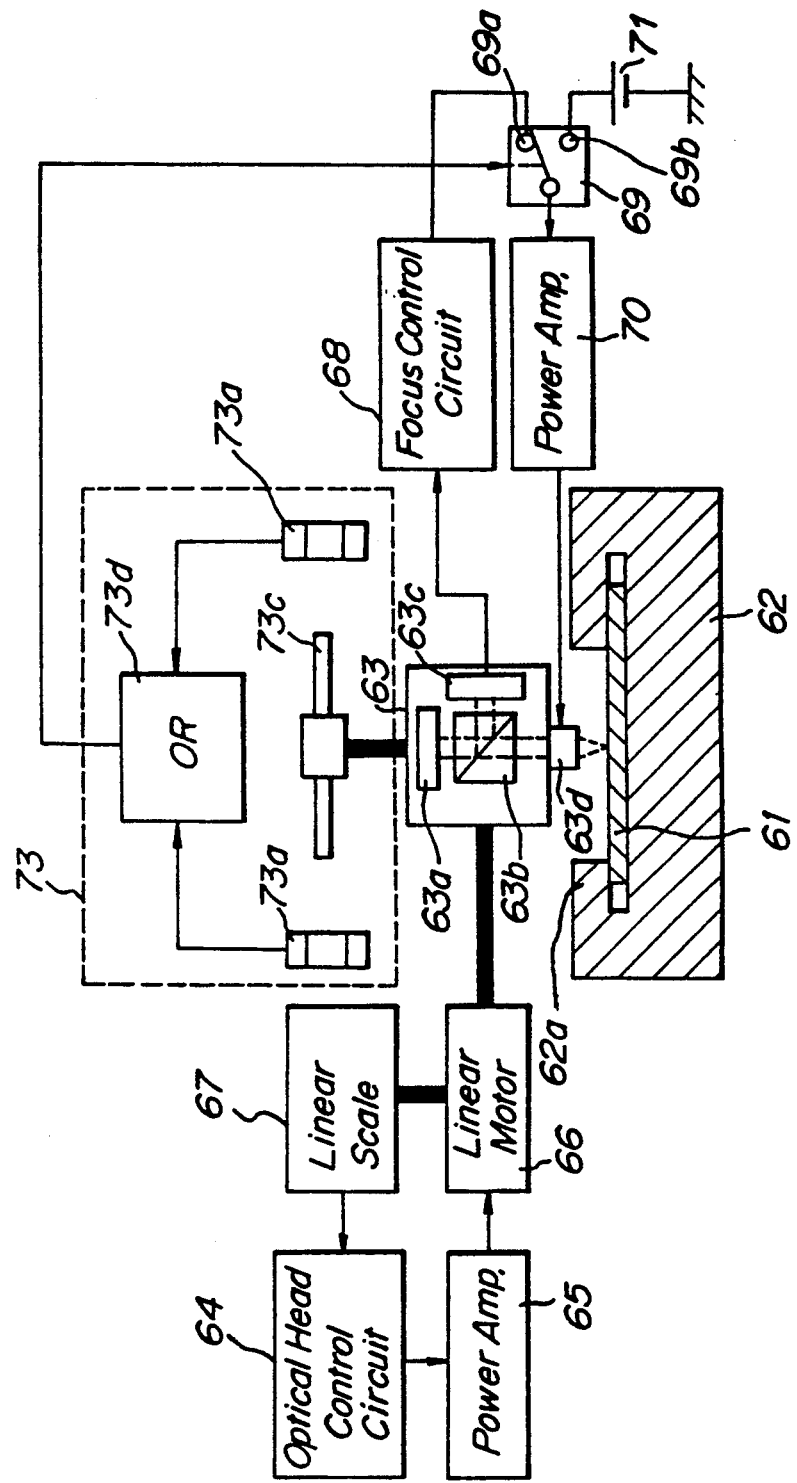
FIG. 8 is a block diagram depicting a construction of an apparatus according to a third embodiment of the present invention.

FIG. 8 is a block diagram indicating a construction of the third embodiment of the apparatus according to the present invention. It should be noted that in FIG. 8, the same numerical numbers are used in the elements corresponding to the elements of the second embodiments, and the explanation therefor is omitted. As clear from FIG. 8, in the second embodiment a limit detection circuit 73 is arranged instead of the scale monitor circuit 72.

The limit detection circuit 73 comprises interrupters 73a and 73b, plate 73c and OR gate 73d. The plate 73c having its length longer than the length of the optical head 63 in the tracking direction is arranged on the optical head 63; and the plate 73c and the interrupters 73a and 73b are arranged such that the plate 73c interrupts the interrupter 73a or 73b before the objective lens 63d makes contact with the shuttle 62 and thus the movable limit of the optical head 63 can be detected. The outputs of the interrupter 73a and 73b are supplied to the analog switch 69 via OR gate 73d as the switching signal.

Therefore, if the optical head 63 is moved over the movable limit due to some cause, the plate 73c interrupts the interrupter 73a or 73b before the objective lens 63d makes contact with the shuttle 62, and the fact that the optical head has been moved over the movable limit is detected thereby. Then the analog switch 69 is switched to the terminal 69b connected to the constant voltage power supply 71 in accordance with the output of the OR gate 73d. When the constant voltage is applied to the power amplifier 70 from the power supply 71, the objective lens 63d is driven to be kept away from the optical card 61 in a direction perpendicular with respect to the information record surface of the optical card 61 contained in the shuttle 62. Therefore, the lowest end portion of the object lens 63d becomes to be positioned higher than the upper end portion of the auxiliary plate 62a of the shuttle 62. Therefore, even when the optical head 63 is driven beyond outside of the auxiliary plate 62a of the shuttle 62, the objective lens would not be made contact with the shuttle 62 and thus it is possible to prevent that the objective lens 63d is broken.

Figure 9:
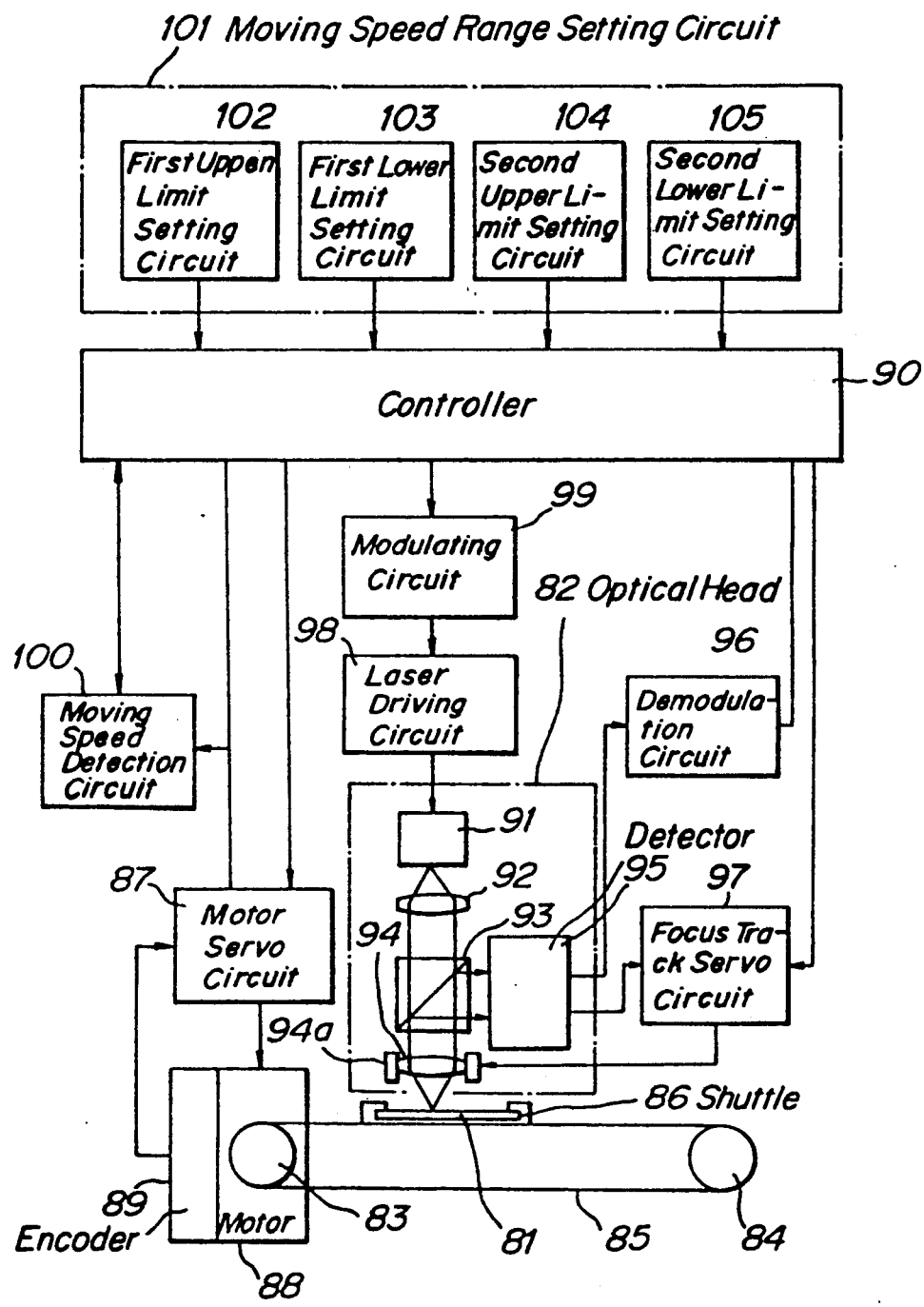
FIG. 9 is a block diagram indicating a construction of an apparatus according to a fourth embodiment of the present invention.

FIG. 9 is a block diagram representing a construction of the fourth embodiment of the apparatus according to the embodiment.

As same as the first to third embodiments explained in the above, the apparatus according to the fourth embodiment is arranged that the optical card 81 is reciprocally driven in the track direction and the optical head 82 in the tracking direction, which is perpendicular to the track direction, to record/reproduce optical information on/from the optical card 81. The optical card 81 is held in the shuttle 86, which is arranged in a given position on a transfer belt 85 laid over the pulleys 83 and 84; and the shuttle 86 is driven in the track direction in a reciprocal manner by a motor 88, which is controlled by a motor servo circuit 87. On the motor 88 is provided a rotary encoder 89 to detect the position of the shuttle 86 with respect to the shuttle 86. It is arranged that one pulse of the rotary encoder 89, for instance, corresponds to a moving distance of 50 μm of the shuttle 86 with respect to the optical head 82. In accordance with positional information of the shuttle 86 supplied from the rotary encoder 89, a controller 90 sends a command to the motor servo circuit 87 so as to control the moving speed of the shuttle 86 constant during which the optical head 82 is moving over the information recording area arranged between both the ID portions of the optical card 81.

In the optical head 82, a writing/reading light beam emitted from a light source, i.e. a laser diode 91, is made incident upon the optical card 81 via a collimator lens 92, prism 93 and an objective lens 94. The reflection beam reflected by the optical card 81 is made incident upon the prism 93 via the objective lens 94 and then reflected thereby in a direction being perpendicular to the direction of the incident light beam to be made incident upon the photo detector 95.

The light beam being made incident upon the photo detector 95 is converted to a photo-electric signal, which is then supplied to a demodulation circuit 96 so as to demodulate the photo-electric signal. The photoelectric signal is also supplied to a focus/track servo circuit 97, where a focus error signal and a track error signal are detected. The thus detected focus and track error signals are fed back to a lens actuator 94a, by which the objective lens 94 is driven in the focus and track directions in order to let the incident light beam follow on the desired track in a focused condition.

The laser diode 91 is connected to the controller 90 via a laser driving circuit 98 and a modulation circuit 99. The controller 90 controls the operation mode of the laser diode 91 such when information is reproduced, an input signal is not modulated in the modulating circuit 99 to let the laser diode 91 output a reading light beam having a low power via the laser driving circuit 98. Further, the controller 90 serves to control the motor servo circuit 87, the demodulating circuit 99 and the focus/track servo circuit 97 so as to seek the desired track in accordance with track address information demodulated in the demodulating circuit 96.

When information is written in the optical card 81, after the desired track is sought in the same manner the writing data supplied from the controller 90 is modulated in the modulating circuit 99 on the basis of a clock signal therefor having a constant frequency; and then the writing light beam having a high power, which is modulated in the modulating circuit 99 in accordance with information to be recorded, is emitted from the laser diode 91 with the aid of the laser driving circuit 98, so that information is recorded on the relevant track of the optical card 81.

To the motor servo circuit 87 is connected a speed detection circuit 100, by which the moving speed of the optical card 81 with respect to the optical head 82 is detected; and the speed detection circuit 100 is connected to the controller 90. Furthermore, to the controller 90 is also connected a moving speed range setting circuit 101. In the circuit 101, the speed ranges are set to allow a variation of the moving speed of the shuttle 86.

In the speed range setting circuit 101, a first allowed moving speed range, i.e., a first upper limit and a first lower limit, is set out for determining the moving speed of shuttle 86, which is for the case that the optical head 82 passes over one of the ID portions of the optical card 81 during recording of information. In the same manner, a second allowed moving speed range, i.e., a second upper limit and a second lower limit, is set out for determining the moving speed of the shuttle 86, which is for the case that the optical head 82 passes over one of the ID portions of the optical card 81 during reproduction of information.

Figure 10:
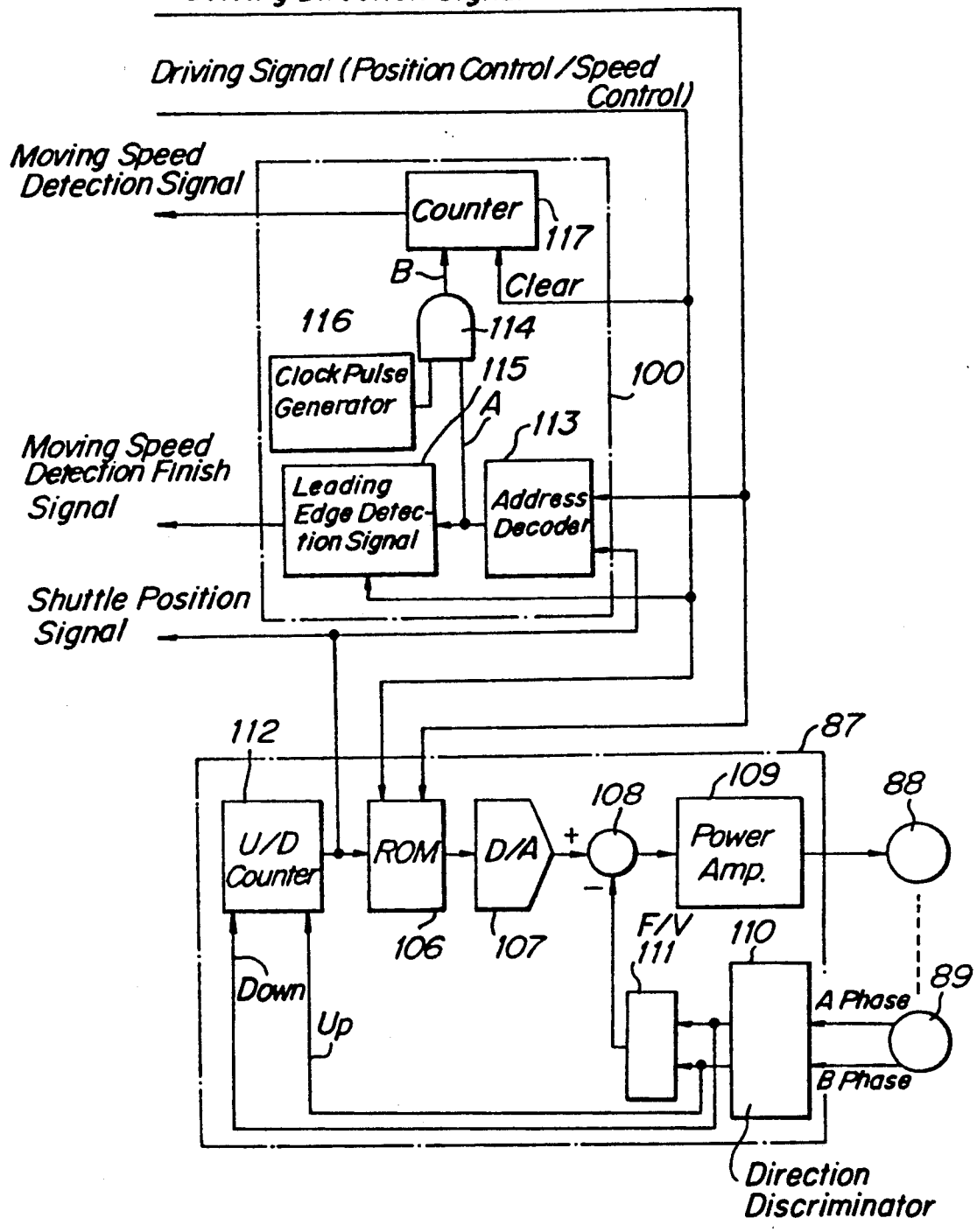
FIG. 10 is a block diagram illustrating a construction of a motor servo circuit and a relative moving speed detection circuit according to the fourth embodiment shown in FIG. 9.

FIG. 10 is a block diagram showing a construction of the motor servo circuit 87 and the moving speed detection circuit 100. The motor servo circuit 87 comprises a ROM 106, D/A convertor 107, a subtractor 108, a power amplifier 109, a direction discriminator 110, F/V convertor 111 and an up and down counter 112. To the ROM 106 are supplied a driving direction signal and a driving signal from the controller 90; an output of the ROM 106 is further supplied to the D/A convertor 107; and the output of the D/A convertor 107 is supplied to the power amplifier 109 via the subtractor 108. The signal amplified in the power amplifier 109 is further supplied to the motor 88. The output of said rotary encoder 109, by which the rotating speed of the motor 88 is detected, is supplied to the direction discriminator 110, in which the rotating direction of the motor 88 is detected. An output pulse signal indicating the transferring direction of the optical card 81 from the direction discriminator 110 is supplied to the F/V convertor 111, in which the frequency of the pulse signal is converted to a voltage level; and further the output of the F/V convertor 111 is supplied to the subtractor 108.

The output pulse signal of the direction discriminator 110 is supplied to input terminals of the up and down counter 112. The counted value in the up and down counter 112 is supplied to the controller 90 and the ROM 106, respectively, as the positional signal of the shuttle 86, as well as to the moving speed detection circuit 100.

The moving speed detection circuit 100 comprises an address decoder 113, an AND gate 114, a leading edge detection circuit 115, a clock pulse generating circuit 116 and a counter 117. The output signal of the up and down counter 112 is supplied to the address decoder 113. The decoder 113 is arranged such that an output signal thereof is converted to a high level when the optical head 82 passes over the ID portion of the optical card 81. The output of the address decoder 113 is supplied to the AND gate 114 and the leading edge detection circuit 115. To the AND gate 114 are also supplied the clock pulses generated in the clock pulse generating circuit 116; and when the level of the output signal of the address decoder 113 is high, i.e., when the optical head 82 passes over the ID portion of the optical card 81, the clock pulses generated in the clock pulse generator 116 are continued to be supplied to the input terminal CK of the counter 117, where the moving speed of the shuttle 86 is detected.

The output signal of the counter 117, i.e., the moving speed detection signal, is supplied to the controller 90, where the counted value of the counter 117 is compared with the moving speed limits set in the moving speed range set circuit 101. The comparison is performed in such a manner that after the output signal of the leading edge detection circuit 115 for detecting the leading edge of the output of the address decoder 113, i.e., the moving speed detection finish signal, is supplied to the controller 90, the moving speed detection signal of the counter 117 is read out by the controller 90.

It should be noted that the counter 117 is made clear with the aid of the driving signal of the shuttle 86. Additionally, the address decoder 113 is arranged such that a pattern for detecting the fact that the light beam emitted from the optical head 82 passes over the ID portion of the optical card 81 is changed by a driving direction signal of the shuttle 86.

The control mode of the movement of the shuttle 86 is changed between the positional control mode and the moving speed control mode in accordance with the driving signal supplied from the controller 90. The ROM 106 is arranged such that an address thereof corresponds to a position of the shuttle 86; that is to say, one address of the ROM 106 corresponds to the movement distance of 50 $\mu$m of the shuttle 86, and in the ROM 106 there is written a position control data which is arranged such that when the driving signal of the shuttle 86 is low level (L), the position of the shuttle 86 is determined at an address corresponding to both edge portions of the optical card 81; and a moving speed control data for forward and backward directions which is arranged such that when the driving signal of the shuttle 86 is high level (H), the shuttle 86 is driven in accordance with the moving direction signal. It should be noted that when the moving direction signal is high level, the shuttle 86 is driven in the forward direction; and when the moving direction signal is lower, the shuttle 86 is driven in the backward direction. The forward direction means a direction from the left side, to the right side and the backward direction means a direction from the right side to the left side.

The shuttle 86 is driven in the forward direction in such manner that when the driving direction signal and the driving signal become high level, a moving speed control data (desired speed) is given to the motor 88 from the ROM 106 via the D/A converter 107 and the power amplifier 109. Then the shuttle 86 is transferred to the forward direction, and the A phase output or the B phase output of the rotary encoder 89, which is arranged on the same axis of the motor 88, is supplied to the direction discriminator 110. The up and down counter 112 showing the position of the shuttle 86 is renewed with the aid of the output pulse signal from the direction discriminator 110, which shows the moving direction of the shuttle 86. At the same time, the output of the direction discriminator 110 is supplied to the subtracter 118 via the F/V convertor 111. In the subtracter 118, the subtraction between the output of the D/A convertor 107, which shows the desired speed, and the output of the F/V convertor 111 is detected; and then it is controlled such that the subtraction becomes zero.

The moving speed control data in ROM 106 is arranged such that when the optical head 82 has passed over the left side ID portion of the optical card 81, it is changed from an acceleration data to a constant speed data; then the optical head 82 has passed over the data portion of the optical card 81, the constant speed data is changed to the declaration data. In the controller 90, when the positional signal of the shuttle 86 supplied from the up and down counter 112 becomes a given value, the driving signal for driving the shuttle 86 is changed from H level to L level to change the control mode of the shuttle 86 from the moving speed controlling mode to the position controlling mode and then stop the shuttle 86.

FIG. 11 is a time chart of signals used in the moving speed detection circuit 100. FIG. 11A shows a structure of the optical card 81, and the relative moving speed of the optical head 82 is varied with respect to the optical card 81, as shown in FIG. 11B. In order to transfer the shuttle 86 in the backward direction, the level of the driving direction signal is changed to L level and the level of the driving signal to H level.

In the moving speed detection circuit 100, the address decoder 113 is arranged so as to output the signal having H level when the output of the up and down counter 112 becomes to correspond to the ID portion of the optical card 81. In this case, the address decoder 113 continues to output the signal having H level (gate signal A) to the AND circuit 114 until the optical head 82 has passed over the ID portion of the optical card 81 in accordance with the driving direction signal, as shown in FIG. 11C. The AND circuit 114 serves to supply the clock signal generated in the clock generator 116 to the CK terminal of the counter 117 during the gate signal A having H level is supplied to the AND circuit 114. That is to say, as shown in FIG. 10, the AND circuit 114 continues to supply the clock signal to the counter 117 during the level of the gate signal A is high.

In the counter 117, the clock signals, which are supplied thereto when the optical head 82 passes over the left side ID portion of the optical card 81, are counted. On the other hand, the output of the address decoder 113 is also supplied to the leading edge detection circuit 115, so that the moving speed detection finish signal is supplied from the circuit 115 to the controller 90 after the optical head 82 has passed over the left side ID portion of the optical card 81 (see FIG. 11E). Further, the driving signal is supplied from the controller 90 to the clear terminals of the counter 117 and the leading edge detection circuit 115, respectively; then these circuits 117 and 115 are made clear when the control mode of the shuttle 86 is changed from the positional control mode to the moving speed control mode.

When the moving speed detection finish signal is supplied to the controller 90, the output of the counter 117, i.e. the moving speed detection signal, is supplied to the controller 90; and then the moving speed detection signal is compared with the desired moving speed set in the moving speed range setting circuit 111.

In the moving speed detection circuit 110, every time period, during which the optical head 82 has passed over the ID portion of the optical card 81, is measured. Therefore, it is proved that the shorter the measured time period the faster the mean moving speed; and the longer the measured time period the later the mean moving speed of the shuttle 86.

In the moving speed range setting circuit 111, a first allowed range of the moving speed of the shuttle 86 when the shuttle 86 passed over the ID portion for recording information is set as the first upper limit 22 of the moving speed and the first lower limit 23 thereof. In the same manner, a second allowed range of the moving speed of the shuttle 86 when the shuttle 86 passed over the ID portion for reproducing information is set as the second upper limit 24 and the second lower limit 25. These first and second allowed ranges of the moving speed of the shuttle 86 are set as first and second allowed ranges of ID portion passing over time period of the optical head 82. In the controller 90, after the optical head 82 has passed over the ID portion of the optical card 81, it is decided whether recording or reproducing should be performed or not in accordance with the comparison result of the allowance set in the circuit 111 and the actually detected moving speed of the shuttle 86.

In case, for instance, a margin of a data length to be recorded is 3% with respect to the length of the data portion of the optical card 81, when the moving speed of the shuttle 86 is faster than the desired moving speed, a margin of the moving speed of the shuttle 86 for reproducing information would be decreased. Additionally, in case, the moving speed of the shuttle 86 is faster than the desired moving speed by 3% or more, the drawback would be caused that information is recorded not only on the data portion but also on the ID portion. And, in case the moving speed of the shuttle 86 is slower than the desired moving speed, there is no possibility to record information on the ID portion, but the margin of the moving speed of the shuttle 86 for reproducing information would also be decreased.

Therefore, in the fourth embodiment of the apparatus according to the invention, a moving speed faster than the desired moving speed by 2% is set in the circuit 111 as the first upper limit; and a moving speed later than the desired moving speed by 2% is as the first lower limit. Further, when information is reproduced from the optical card 81, the information reproduction signal is modulated simultaneously with a clock signal, which is produced in accordance with the reproduction signal obtained from the optical card 81. Therefore, it is possible to reproduce even an information signal having a variation of the moving speed if the clock signal can be produced within the range.

Second upper and lower limits of the moving speed of the shuttle 86 are set for reproducing information in the moving speed range setting circuit 101. The second upper limit is faster than the desired moving speed by 5%, and the second lower limit of the moving speed is slower than the desired moving speed by 5%. That is to say, in the present embodiment, the tolerance of the deviation from the desired moving speed for reproducing information is set smaller than the tolerance for recording information.

FIG. 12 is a flow chart representing an operation conducted in the fourth embodiment of the present invention. The controller 90 sends commands necessary for recording/reproducing information to each circuit and waits for the moving speed detection final signal to be supplied from the moving speed detection circuit 20, as shown in Step 1 of FIG. 12. After the moving speed detection signal is supplied to the controller 90, the controller 90 reads out the moving speed detection signal from the counter 117, as shown in Step 2; and then whether information is recorded or reproduced is judged in the controller 90 as shown in Step 3. In case information is recorded, it is checked out whether the moving speed detected by the moving speed detection circuit 100 is faster than the first upper limit.

If the moving speed is faster than the first upper limit, information recording operation is stopped, as shown in Step 5. On the other hand, when the moving speed is slower than the first upper limit, it is checked out whether the detected moving speed is slower than the first lower limit. If the detected moving speed is faster than the first lower limit, the moving speed of the shuttle 86 is normal, and then information recording operation is performed (Step 7), but if the detected moving speed is slower than the first lower limit, information recording operation should be stopped. When information is reproduced in the apparatus, as shown in Step 8, whether the detected moving speed of the shuttle 86 is faster than the second upper limit is checked; and if the detected speed is faster than the second upper limit, the information reproduction operation is stopped; on the other hand, in case the detected speed is slower than the second upper limit, it is checked whether the detected speed is slower than the second lower limit; and if the detected speed is slower than the second lower limit, the information reproduction operation is stopped, and if the detected speed is faster than the second lower limit, information is reproduced from the optical card 81 because the moving speed of the shuttle 86 is normal.

In conclusion, in the fourth embodiment of the present invention, it is possible to inhibit recording of information on the optical card 81 when the moving speed of the shuttle 86 is deviated from the desired moving speed by ±2%, so that recording of information on the ID portions can be prevented. Additionally, information can be recorded on the optical card 81 without causing a variation of the moving speed of the shuttle 86. On the other hand, when information is reproduced from the optical card 81, it is possible to inhibit reproduction of information when the moving speed of the shuttle 86 is deviated from the desired moving speed by ±5%.

It should be noted that when the shuttle 86 is moved from right side to left side, the gate signal A having a high level is generated from the address decoder 113 when the optical head 82 passes over the right side ID portion of the optical card 81 as shown in FIG. 11F; and then the moving speed of the shuttle 86 is detected during when the gate signal A having a waveform shown in FIG. 11F is supplied to the AND gate 114.

In the fourth embodiment stated in the above, the operation mode in the apparatus for an optical card 81 having ID portions at both sides thereof is explained, but the present invention can be applied to the apparatus for an optical card having only one ID portion at either side thereof.

Generally, the relative moving speed of the shuttle with respect to the optical head when information is recorded is limited by an optical sensitivity of the recording medium and an optical output of the laser diode, etc.; but it is desired that the relative moving speed for reproducing information be high, because there is no requirement about the optical output of the laser diode, except in the case that information recorded on a plurality of tracks is reproduced at the same time. Therefore, it is possible to apply the present invention to an apparatus in which recording and reproducing are performed at different speeds; that is to say, recording is performed at a lower moving speed and reproducing at a higher moving speed. Further, in case the moving speed of the shuttle is changed, it may be possible to vary the first upper limit or the first lower limit in accordance with the thus changed moving speed of the shuttle.

In the fourth embodiment explained above, the rotary encoder 88 is used to detect the position of the shuttle 86 with respect to the optical head 82, but it may be possible to arrange a linear encoder instead of the rotary encoder. Further, in the fourth embodiment, it is arranged that the shuttle 86 is moved in the track direction with respect to the optical head 82, but it may be possible to arranged such that the optical head 2 is moved in the track direction with respect to the optical card 81. Furthermore, in the fourth embodiment, the moving speed of the shuttle 86 is detected with the aid of only one ID portion of the optical card 81 during the shuttle 86 is transferred one time, but it may be possible to detect the moving speed of the shuttle 86 with the aid of both ID portions of the optical card.

Moreover, it may be possible to arrange that the time period from an instance, at which information has finished to be recorded, to an instance that the next ID portion is detected, is measured, and then whether information is recorded on the ID portion or not is judged. Further, it may be possible to record the thus measured time period on the information recording region of the ID portion and then the time period is utilized for reproducing information. For instance, in case the time period from the instance that the recording has been finished to the instance that the head of the next ID portion is detected, is so long that it is considered that the mean recording pitch in the data portion is small. Therefore, in such a case, it may be possible to set the center frequency of a standard clock so as to become a clock frequency suitable for reproducing data at the mean recording pitch.

As stated in detail above, in the apparatus according to the first embodiment of the present invention, the anomalous state of the relative movement of the optical card and the optical head can be controlled without arranging a special detection means, such as limit switches.

Further, in the apparatus according to the second and third embodiments of the present invention, when the optical head moves in an anomalous manner, that is to say, the optical head moves over the positional limitation thereof, it is possible to prevent the objective lens of the optical head from making contact with the shuttle and is broken.

Furthermore, in the apparatus according to the fourth embodiment of the present invention, the tolerance of the relative moving speed of the optical card and the optical head for recording is arranged to be smaller than that for reproducing information. Therefore, it is possible to increase the reliability in recording-/reproducing information on/from the optical card.

What is claimed is:

1. An apparatus for recording/reproducing optical information on and/or from an optical card in which the optical card and an optical head are relatively moved with respect to each other in a track direction and a tracking direction to record and/or reproduce optical information on and/or from said optical card, said apparatus comprising:

driving means for causing a relative movement of said optical head and said optical card with respect to each other;

anomalous condition detection means for detecting a condition of said relative movement between the optical card and the optical head and for deriving from said condition of said relative movement an output indicating whether said condition of said relative movement is anomalous;

control signal production means, responsive to said output from said anomalous condition detection means, for producing at least one control signal; and control means, responsive to said at least one control signal from said control signal production means, for controlling said apparatus in accordance with the control signal produced in said control signal production means, wherein:

said anomalous condition detection means comprises a relative moving speed detection means for detecting the relative moving speed of the optical card and the optical head and a relative moving speed range setting means for setting a first moving speed range of the relative moving speed of the optical card and the optical head when optical information is recorded on the optical card and a second moving speed range of the relative moving speed of the optical card and the optical head when optical information is reproduced from the optical card;

said control signal production means produces a control signal when said relative moving speed for recording optical information is outside the first moving speed range or when said relative moving speed for reproducing optical information is outside the second moving speed range;

said control means controls the apparatus so as to inhibit to record and/or reproduce optical information on/from the optical card in response to the control signal; and said first moving speed range is smaller than said second moving speed range.

2. An apparatus for recording and/or reproducing optical information on and/or from an optical card according to claim 1, wherein:

said first moving speed range is bounded by a first upper limit and a first lower limit, and said second moving speed range is bounded by a second upper limit and a second lower limit; and wherein said relative moving speed range setting means comprises a first upper limit setting means for setting said first upper limit, a first lower limit setting means for setting said first lower limit, a second upper limit setting means for setting said second upper limit, and a second lower limit setting means for setting said second lower limit.

3. An apparatus for recording and/or reproducing optical information on and/or from an optical card according to claim 2, wherein:

said relative moving speed detection means comprises a position detection means for detecting a position of said optical card with respect to the optical head to reproduce a positional signal; and the relative moving speed of the optical card is detected on the basis of said positional signal.

4. An apparatus for recording and/or reproducing optical information on and/or from an optical card according to claim 3, wherein:

said relative moving speed of said optical card is compared with said first upper limit and said first lower limit set in the relative moving speed range setting circuit; and when the relative moving speed of said optical card is not between said upper and lower limits, recording of optical information on the optical card is inhibited.

5. An apparatus for recording and/or reproducing optical information on and/or from an optical card according to claim 4, wherein:

said relative moving speed of said optical head is compared with said second upper limit and said second lower limit set in the relative moving speed range setting circuit; and when the relative moving speed of said optical head is not between said second upper and lower limits, reproduction of optical information from the optical card is inhibited.

6. An apparatus for recording and/or reproducing optical information on and/or from an optical card according to claim 5, wherein:

said first upper limit is set at 2% or more than a desired relative moving speed of the optical card and said first lower limit is set at 2% or less than said desired relative moving speed of the optical head; and said second upper limit is set at 5% or more than a desired relative moving speed of the optical head and said second lower limit is set at 5% or less than said desired relative moving speed of the optical head.

7. An apparatus for recording and/or reproducing optical information on and/or from an optical card according to claim 1, wherein:

said optical card has ID portions at both sides thereof in the track direction.

8. An apparatus for recording and/or reproducing optical information on and/or from an optical card according to claim 7, wherein:

said relative moving speed of the optical head is detected after the optical head has passed over both ID portions of the optical card.

9. An apparatus for recording and/or reproducing optical information on and/or from an optical card according to claim 1, wherein:

said optical card has one ID portion at one side there of in the track direction.

10. An apparatus for recording and/or reproducing optical information on and/or from an optical card according to claim 1, wherein:

optical information is recorded on said optical card at a lower speed than a speed at which optical information is reproduced from said optical card.

11. An apparatus for recording and/or reproducing optical information on and/or from an optical card according to claim 10, wherein:

said first and second upper limits and said first and second lower limits are varied in accordance with the optical information recording speed and the optical information reproducing speed.

* * * * *